(12) United States Patent
Anjo

(10) Patent No.: US 10,534,506 B2
(45) Date of Patent: Jan. 14, 2020

(54) TASK MANAGEMENT DEVICE, TASK MANAGEMENT METHOD AND COMPUTER READABLE RECORDING MEDIUM

(71) Applicant: CASIO COMPUTER CO., LTD., Shibuya-ku, Tokyo (JP)

(72) Inventor: Keita Anjo, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 431 days.

(21) Appl. No.: 15/439,667

(22) Filed: Feb. 22, 2017

(65) Prior Publication Data

US 2017/0277371 A1 Sep. 28, 2017

(30) Foreign Application Priority Data

Mar. 23, 2016 (JP) ................................. 2016-058527

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0488* (2013.01); *G06F 17/245* (2013.01);
(Continued)

(58) Field of Classification Search
CPC .... G06F 3/0488; G06F 17/245; G06F 17/248; G06F 21/31; G06Q 10/1093
(Continued)

(56) References Cited

U.S. PATENT DOCUMENTS 6,675,356 B1 * 1/2004 Adler .................. G06Q 10/109
707/999.001
7,349,920 B1 * 3/2008 Feinberg .............. G06Q 10/109
(Continued)

FOREIGN PATENT DOCUMENTS

JP 08077111 A 3/1996
JP 09120418 A 5/1997
(Continued)

OTHER PUBLICATIONS

Japanese Office Action (and English language translation thereof) dated Nov. 27, 2018 issued in counterpart Japanese Application No. 2016-058527.
(Continued)

*Primary Examiner* — David Phantana-angkool
(74) *Attorney, Agent, or Firm* — Holtz, Holtz & Volek PC

(57) ABSTRACT

A task management device includes a first display controller which controls a display to display a schedule template including a plurality of schedule areas, predetermined date information or time zone information being associated with each schedule area; a first selecting unit which selects a predetermined stamp mark in accordance with a user's operation from a plurality of stamp marks which indicate different types of tasks and with which different message information is associated; and a second selecting unit which selects a schedule area in which the stamp mark selected by the first selecting unit is placed in accordance with a user's operation from the plurality of schedule areas. The first display controller controls the display to display the schedule template where the stamp mark selected by the first selecting unit is placed in the schedule area selected by the second selecting unit.

18 Claims, 7 Drawing Sheets

(51) Int. Cl.
*G06F 3/0488* (2013.01)
*G06F 21/31* (2013.01)
*G06F 17/24* (2006.01)
*G06Q 10/10* (2012.01)
*H04L 29/06* (2006.01)

(52) U.S. Cl.
CPC ............ *G06F 17/248* (2013.01); *G06F 21/31* (2013.01); *G06Q 10/1093* (2013.01); *H04L 63/083* (2013.01)

(58) Field of Classification Search
USPC .......................................................... 715/781
See application file for complete search history.

(56) References Cited

U.S. PATENT DOCUMENTS

| | | | | |
|---|---|---|---|---|
| 7,693,736 B1* | 4/2010 | Chu | ................... | G06Q 10/1095 705/7.19 |
| 8,635,533 B2* | 1/2014 | Zinn | ................... | G06Q 10/109 715/733 |
| 10,024,671 B2* | 7/2018 | Schreier | ............. | G01C 21/3415 |
| 10,127,188 B2* | 11/2018 | Bastide | .............. | G06Q 10/1095 |
| 10,168,669 B2* | 1/2019 | Knappe | ................... | G04G 21/04 |
| 10,210,483 B2* | 2/2019 | Liu | ................... | G06Q 10/1095 |
| 2014/0365107 A1* | 12/2014 | Dutta | ................... | G01C 21/343 701/408 |
| 2017/0127260 A1* | 5/2017 | Grube | .................... | H04W 4/90 |
| 2018/0367840 A1* | 12/2018 | Kleinerman | ....... | H04N 21/4312 |

FOREIGN PATENT DOCUMENTS

| | | |
|---|---|---|
| JP | 11096483 A | 4/1999 |
| JP | 2004086741 A | 3/2004 |
| JP | 2014238705 A | 12/2014 |
| JP | 2015201114 A | 11/2015 |

OTHER PUBLICATIONS

Japanese Office Action (and English language translation thereof) dated Sep. 25, 2018 issued in counterpart Japanese Application No. 2016-058527.

* cited by examiner

FIG.3

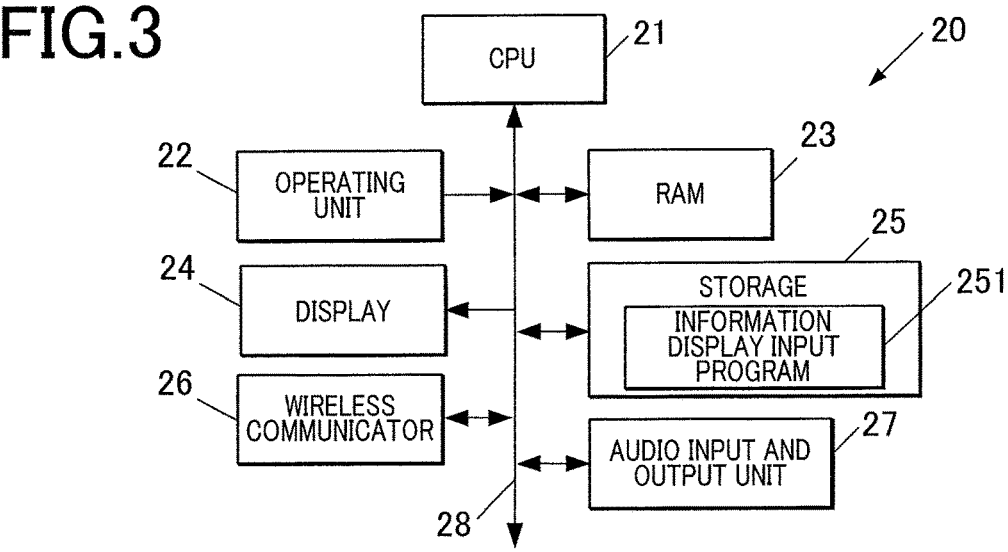

FIG.4

| STAMP NUMBER | SIGN | STAMP IMAGE | TASK CONTENT | MESSAGE SHOWN IN TO-DO LIST | DISPLAY COLOR |
|---|---|---|---|---|---|
| 1 | 発 | (発) | INSTRUCT TO PLACE ORDER | MR./MS. XX REQUESTED ORDER PLACEMENT. | BLACK |
| 2 | 掃 | (掃) | INSTRUCT TO CLEAN | MR./MS. XX REQUESTED CLEANING. | BLACK |
| 3 | 予 | (予) | SHARE RESERVATION INFORMATION | MR./MS. XX ENTERED RESERVATION SCHEDULE. | BLACK |
| 4 | ミ | (ミ) | INFORM MEETING SCHEDULE | MR./MS. XX ENTERED MEETING SCHEDULE. | BLACK |
| 5 | 忘 | (忘) | SHARE LOST AND FOUND INFORMATION | MR./MS. XX ENTERED INFORMATION ON LOST AND FOUND ITEM. | BLACK |
| 6 | 棚 | (棚) | INSTRUCT TO MAKE INVENTORY | MR./MS. XX ENTERED REQUEST FOR INVENTORY. | BLACK |
| 7 | イ | (イ) | SHARE EVENT INFORMATION | MR./MS. XX ENTERED EVENT INFORMATION. | BLACK |
| 8 | 休 | (休) | TEMPORARY CLOSING OR MANAGER OUT OF OFFICE | MR./MS. XX ENTERED CLOSING INFORMATION. | BLACK |
| 9 | 買 | (買) | CONSUMABLE SUPPLY SHOPPING DAY | MR./MS. XX ENTERED SCHEDULE FOR CONSUMABLE SUPPLY SHOPPING. | BLACK |
| 10 | 学 | (学) | EVENT AT SCHOOL IN DISTRICT | MR./MS. XX ENTERED INFORMATION ON EVENT AT SCHOOL IN DISTRICT. | BLACK |
| 11 | 社 | (社) | COMPANY PRESIDENT AND OWNER RELATED VISITOR | MR./MS. XX ENTERED IMPORTANT SCHEDULE. | BLACK |
| 12 | 期 | (期) | STARTING DAY OF LIMITED PERIOD PROMOTION MENU | MR./MS. XX ENTERED SCHEDULE OF LIMITED PERIOD PROMOTION MENU. | BLACK |
| 13 | 伝 | (伝) | HAVE MESSAGE | MR./MS. XX ENTERED AUDIO MEMO. | BLACK |
| : | : | : | : | : | : |

FIG.5A

| 41 STAFF NUMBER | 42 NAME | 43 POSITION | 44 TASK IN CHARGE | 45 PASSWORD | 46 IMPORTANCE |
|---|---|---|---|---|---|
| 1234 | TARO TANAKA | OWNER | MANAGEMENT | aatanaka | 3 |
| 1235 | JIRO YAMADA | MANAGER | OVERALL TASKS | bbyamada | 2 |
| 1236 | SABURO SUZUKI | PART TIME STAFF | DINING AREA | ccsuzuki | 1 |
| 1237 | SHIRO KATO | PART TIME STAFF | KITCHEN | ddkatoh | 1 |
| : | : | : | : | : | : |

| 51 TASK NUMBER | 52 PERSONAL/ BUSINESS | 53 PERSON WHO MADE ENTRY | 54 IMPORTANCE | 55 ENTERED DATE AND TIME | 56 DEADLINE | 57 COMPLETED/ NOT COMPLETED |
|---|---|---|---|---|---|---|
| 1 | PERSONALLY ENTERED TO-DO TASK | TARO TANAKA | 3 | 2016/2/5 16:35 | 2016/2/5 | COMPLETED |
| 2 | PERSONALLY ENTERED TO-DO TASK | SABURO SUZUKI | 1 | 2016/2/5 17:35 | 2016/2/8 | NOT COMPLETED |
| 3 | PERSONALLY ENTERED TO-DO TASK | JIRO YAMADA | 2 | 2016/2/5 18:35 | 2016/2/8 | NOT COMPLETED |
| : | : | : | : | : | : | : |

| 58 PERSON WHO CARRIED OUT TASK | 59 TASK COMPLETED DATE | 60 MESSAGE | 61 TASK ASSOCIATION | 62 ATTACHED FILE | 63 INFORM ALL STAFF OTHER THAN PERSON WHO MADE ENTRY | 64 STAMP NUMBER |
|---|---|---|---|---|---|---|
| TARO TANAKA | 2016/2/5 | TARO TANAKA ... | NO | memo1.txt | YES | 4 |
| NO | NO | FROM SABURO SUZUKI ... | NO | memo2.txt | YES | 1 |
| NO | NO | FROM JIRO YAMADA ... | NO | memo3.txt | YES | 1 |
| : | : | : | : | : | : | : |

FIG.6

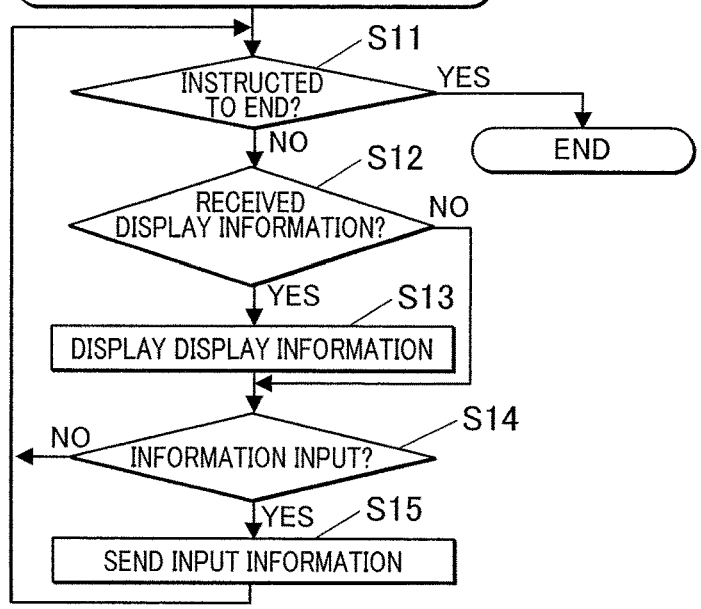

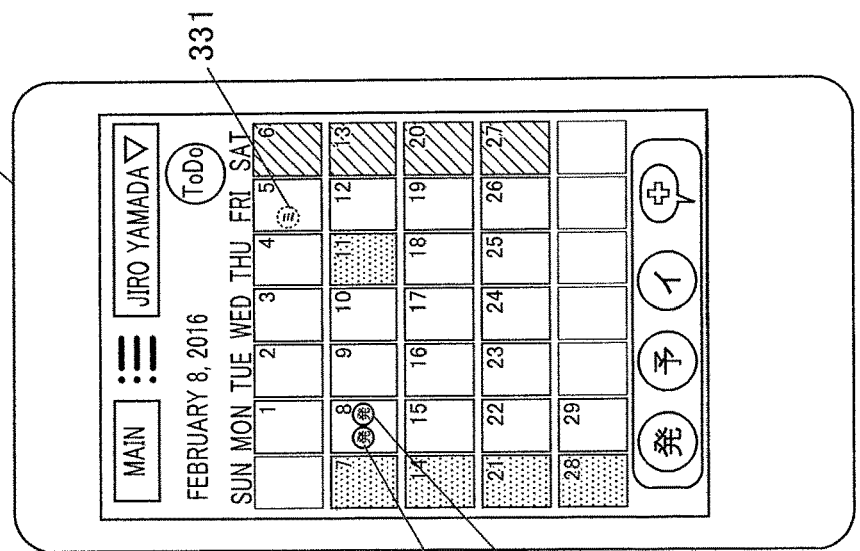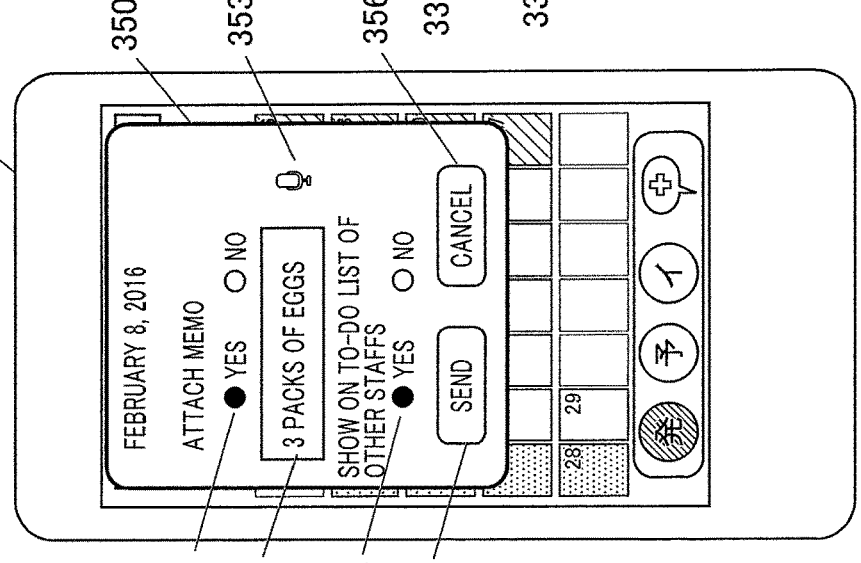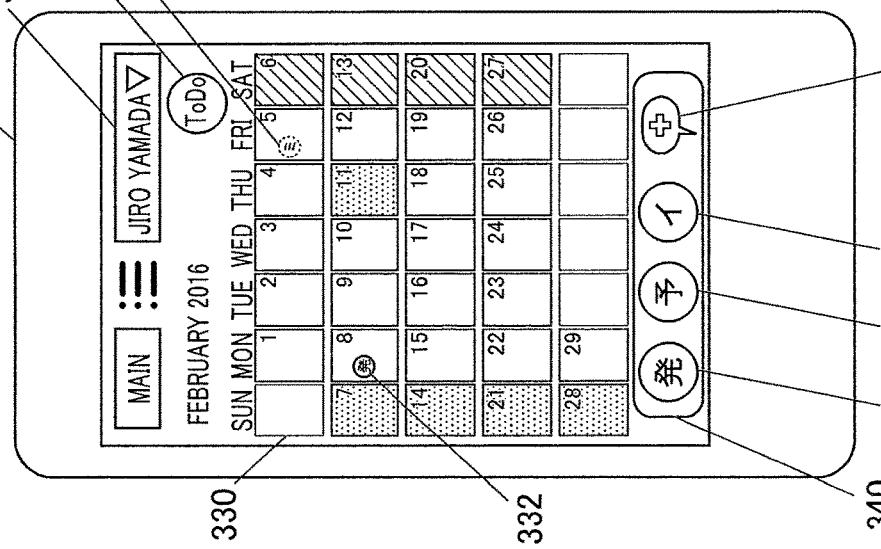

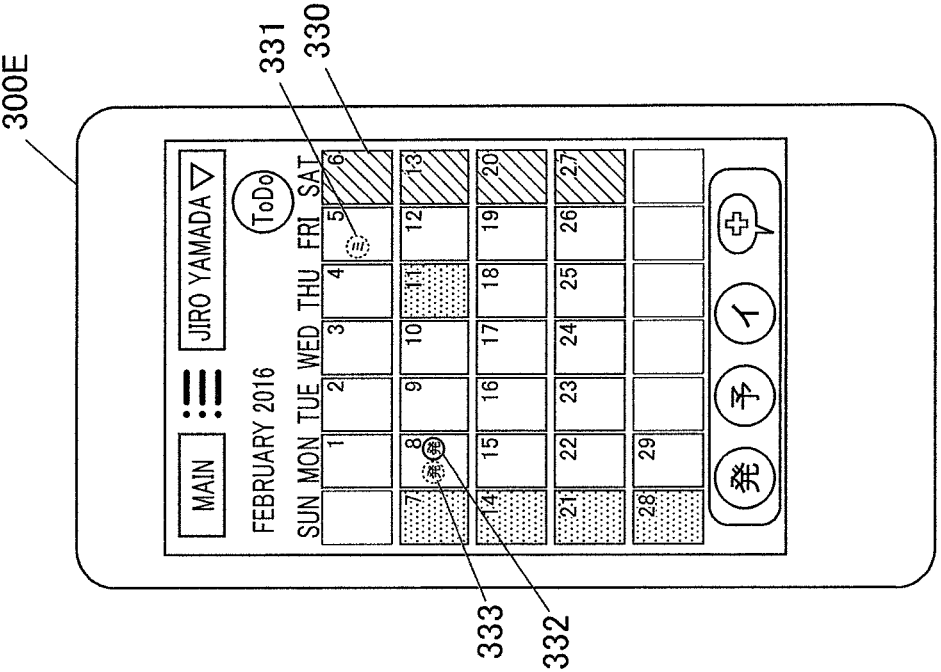
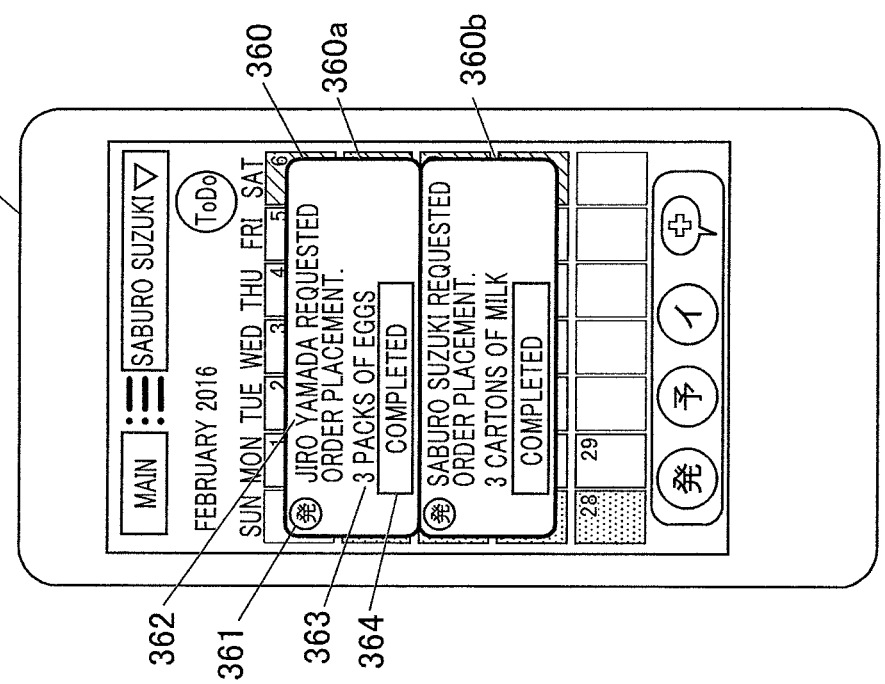

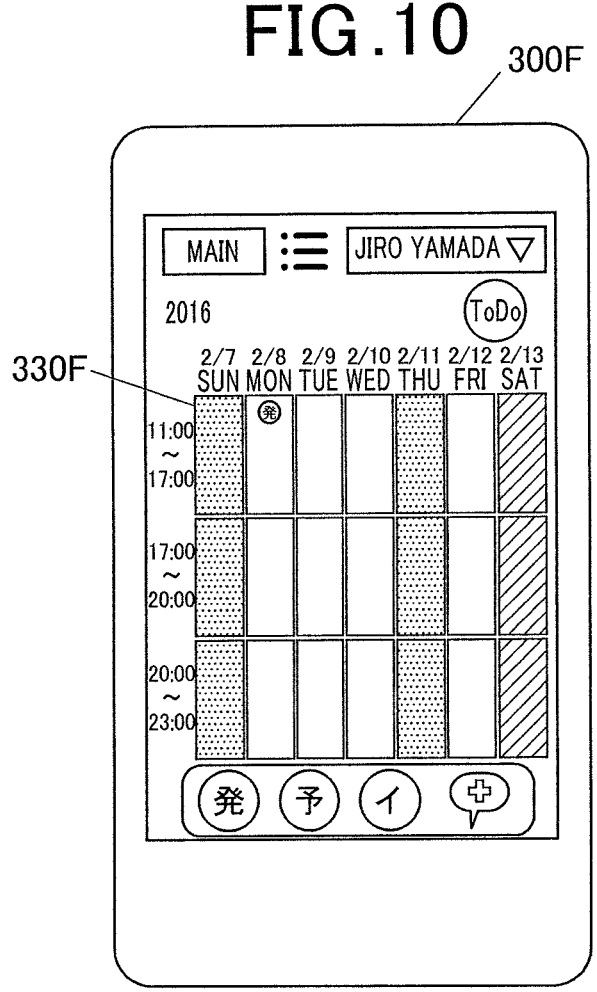

TASK MANAGEMENT DEVICE, TASK MANAGEMENT METHOD AND COMPUTER READABLE RECORDING MEDIUM

BACKGROUND OF THE INVENTION

1. Field of the Invention

The present invention relates to a task management device, a task management method and a computer readable recording medium.

2. Description of Related Art

Traditionally, there is known a to-do task management device for managing the tasks which need to be carried out by a user.

Further, there is known an information processing device which is shared among a plurality of users in a family for displaying a message which is input by an arbitrary user at the time when the device is turned on and further showing schedules on a calendar (see Japanese Unexamined Patent Application Publication No. H09-120418).

SUMMARY OF THE INVENTION

In the above traditional information processing device, there is a need to enter a schedule in the calendar by inputting letters in advance when showing a task as a schedule. A user himself/herself needs to come up with and input the letter string for the schedule so that the letter string will fit in the schedule region in each date of the calendar and this is a great burden on the user. Further, displaying the schedules using letter strings can be confusing when many schedules are entered and the schedules cannot be recognized at a glance.

Objects of the present invention are to provide easy input and easy recognition of the contents of the tasks which need to be carried out as well as the deadlines for carrying out the tasks and to provide support so as to assure that the tasks will be carried out by their deadlines.

According to an aspect of the present invention, there is provided a task management device including: a first display controller which controls a display to display a schedule template including a plurality of schedule areas, predetermined date information or time zone information being associated with each schedule area; a first selecting unit which selects a predetermined stamp mark in accordance with a user's operation from a plurality of stamp marks which indicate different types of tasks and with which different message information is associated; and a second selecting unit which selects a schedule area in which the stamp mark selected by the first selecting unit is placed in accordance with a user's operation from the plurality of schedule areas, wherein the first display controller controls the display to display the schedule template where the stamp mark selected by the first selecting unit is placed in the schedule area selected by the second selecting unit.

According to another aspect of the present invention, there is provided a task management method including: first display controlling to control a display to display a schedule template including a plurality of schedule areas, predetermined date information or time zone information being associated with each schedule area; first selecting to select a predetermined stamp mark in accordance with a user's operation from a plurality of stamp marks which indicate different types of tasks and with which different message information is associated; and second selecting to select a schedule area in which the stamp mark selected in the first selecting is placed in accordance with a user's operation from the plurality of schedule areas, wherein in the first display controlling, the schedule template where the stamp mark selected in the first selecting is placed in the schedule area selected in the second selecting is displayed.

According to still another aspect of the present invention, there is provided a non-transitory computer readable recording medium storing a program for making a computer of a task management device execute a procedure including: a first display controlling process to control a display to display a schedule template including a plurality of schedule areas, predetermined date information or time zone information being associated with each schedule area; a first selecting process to select a predetermined stamp mark in accordance with a user's operation from a plurality of stamp marks which indicate different types of tasks and with which different message information is associated; and a second selecting process to select a schedule area in which the stamp mark selected in the first selecting process is placed in accordance with a user's operation from the plurality of schedule areas, wherein in the first display controlling process, the schedule template where the stamp mark selected in the first selecting process is placed in the schedule area selected in the second selecting process is displayed.

According to the present invention, the contents of the tasks which need to be carried out as well as the deadlines for carrying out the tasks can be input easily and can be recognized easily, and further, the users can be supported so as to assure that the tasks will be carried out by their deadlines.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 is a block diagram showing the functional structure of a terminal device;

FIG. 4 shows the structure of a stamp data table;

FIG. 5A shows the structure of an account data table;

FIG. 5B shows the structure of a task data table;

FIG. 6 is a flowchart of an information display input process;

FIG. 8A shows the first task communication screen;

FIG. 8B shows the second task communication screen;

FIG. 8C shows the third task communication screen;

FIG. 9A shows the fourth task communication screen;

FIG. 9B shows the fifth task communication screen; and

FIG. 10 shows the sixth task communication screen.

DETAILED DESCRIPTION OF THE PREFERRED EMBODIMENT

Figure 1:
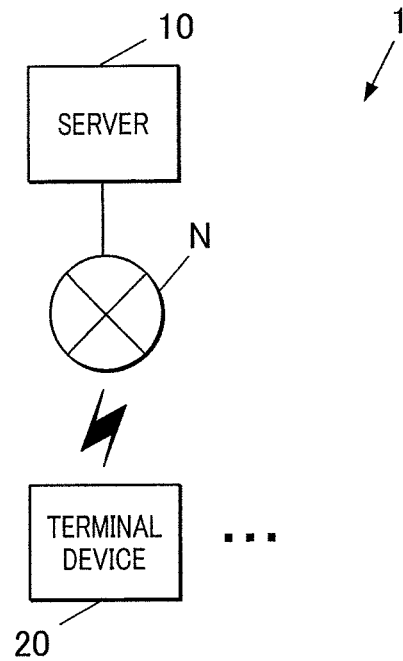
FIG. 1 is a block diagram showing the task management system according to an embodiment of the present invention.

Hereinafter, an embodiment of the present invention will be described in detail with reference to the drawings. However, the present invention is not limited to the examples shown in the drawings.

Figure 2:
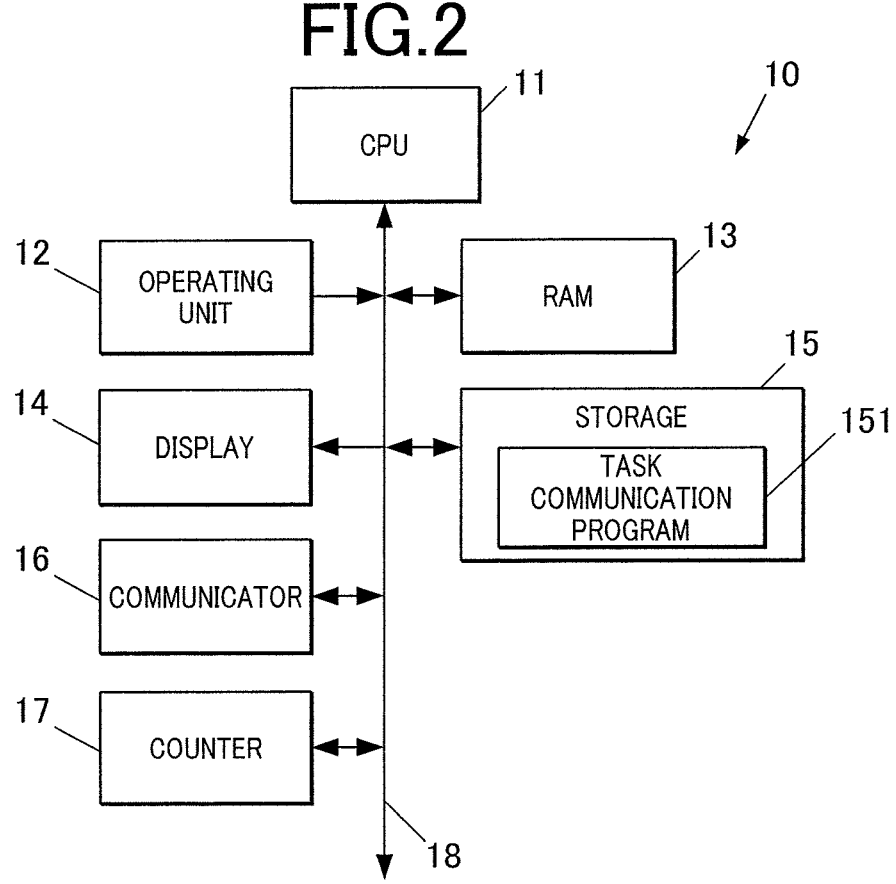
FIG. 2 is a block diagram showing the functional structure of a server.

With reference to FIGS. 1 to 3, the device structures according to the embodiment will be described. First, with reference to FIG. 1, the task management system 1 of the embodiment will be described. FIG. 1 is a block diagram showing the task management system 1 of the embodiment.

The task management system 1 includes a server 10 and a plurality of terminal devices 20 as displays. In the embodiment, a case where the task management system 1 is a system shared among a plurality of staffs (owner, manager, part time staffs, etc.) who work at a privately owned restaurant is taken as an example. However, the present invention is not limited to be applied to such situation and can be applied to any other situations.

The server 10 is a server which is connected to a communication network N and manages information relating to tasks (to-do tasks) which need to be carried out by the users of the terminal devices 20. The communication network N is the internet. However, the communication network N may be other networks such as LAN (Local Arear Network), etc.

The terminal devices 20 are portable terminal devices owned by the users who are the staffs at the restaurant. Here, a case where the terminal devices 20 are smartphones is taken as an example to be described. However, this is not limitative in any way. The terminal devices 20 may be other portable terminal devices such as tablet type PCs (Personal Computers), mobile phones, PDAs (Personal Digital Assistants), laptop PCs, etc. or other terminal devices such as desktop PCs, etc. The terminal devices 20 receive inputs such as operations carried out by the users, send the inputs to the server 10 and displays the information received from the server 10. The terminal devices 20 are further connected to a communication network N via a base station, access points (both not shown), etc. of the communication network N.

With respect to the task management system 1, the information relating to the tasks which are to be carried out by the users of the plurality of the terminal devices 20 is managed by the server 10. However, this is not limitative in any way. The task management system 1 may only include one terminal device 20 owned by a private user or the task management system 1 may include one terminal device 20 shared by a plurality of users.

Next, with reference to FIG. 2, the functional structure inside the server 10 will be described. FIG. 2 is a block diagram showing the functional structure of the server 10.

As shown in FIG. 2, the server 10 includes a CPU (Central Processing Unit) 11 as an enter unit, a first display controller, a second display controller and a completion setting unit, an operating unit 12, a RAM (Random Access Memory) 13, a display 14, a storage 15 as a storage unit, a communicator 16 as the first selecting unit, a second selecting unit, a first input unit and a second input unit, and a counter 17. The individual units of the server 10 are connected to each other via a bus 18.

The CPU 11 controls the individual units of the server 10. The CPU 11 reads out the specified program among the system program and the application programs stored in the storage 15, deploys the specified program in the RAM 13 and carries out various types of processes in cooperation with the program.

The operating unit 12 includes a key input unit such as a key board or the like and a pointing device such as a mouse or the like. The operating unit 12 receives key inputs and position inputs, and outputs the operating information relating to the inputs to the CPU 11.

The RAM 13 is a volatile memory and forms a work area for temporarily storing various types of data and programs.

The display 14 is configured by including a LCD (Liquid Crystal Display), an EL (Electroluminescent) display or the like and carries out various types of displays in accordance with the display information instructed by the CPU 11.

The storage 15 is configured by including a HDD (Hard Disk Drive), a SSD (Solid State Drive) or the like and data and programs can be written in and can be read out. Specifically, in the storage 15, the task communication program 151, a stamp data table 30 (after-mentioned), an account data table 40 and a task data table 50 are stored.

The communicator 16 is configured by including a network card or the like and is connected to the communication network N so as to carry out communication with other devices included in the communication network N. The CPU 11 can communicate with the terminal devices 20 in the communication network N via the communicator 16.

The counter 17 is a real time clock. The counter 17 counts the current date and time and outputs the counted current date and time information to the CPU 11.

Next, with reference to FIG. 3, the functional structure of a terminal device 20 will be described. FIG. 3 is a block diagram showing the functional structure of a terminal device 20.

A terminal device 20 includes a CPU 21, an operating unit 22, a RAM 23, a display 24, a storage 25, a wireless communicator 26 and an audio input and output unit 27. The individual units of the terminal device 20 are connected to each other via a bus 28.

Since the CPU 21, the RAM 23 and the display 24 are the same as the CPU 11, the RAM 13 and the storage 25 of the server 10, their overlapping description will be omitted and the different aspects will be mainly described.

The CPU 21 controls the individual units of the terminal device 20. The operating unit 22 includes a touch panel which is provided on the display screen of the display 24. The operating unit 22 receives touch inputs carried out by a user and outputs the operating information relating to the touch inputs to the CPU 21.

The storage 25 is configured by including a flash memory, an EEPROM (Electrically Erasable Programmable ROM) or the like and data and programs can be written in and can be read out. Specifically, in the storage 25, the information display input program 251 is stored.

The wireless communicator 26 includes an antenna, a modulation and demodulation circuit, a signal processing circuit and the like and carries out sending and receiving of information with a base station, access points, etc. in the communication network N through wireless radio wave. Therefore, the CPU 21 can communicate with the server 10 by the wireless communicator 26 via a base station, access points, etc. in the communication network N.

The audio input and output unit 27 includes an audio input unit including a microphone, an AD converter and the like and an audio output unit including a DA converter, an amplifier, a speaker and the like. At the time of audio input, the audio input and output unit 27 receives an audio input from a user through the microphone, converts an audio input signal to digital audio input information and outputs the digital audio input information to the CPU 21. At the time of audio output, the audio input and output unit 27 converts an audio output signal to an analog audio output signal and outputs the audio from the speaker. With respect to the terminal device 20 as a smartphone, other configuration units such as a positioning unit are omitted in the drawings and their description is also omitted.

Next, with reference to FIGS. 4 and 5, the stamp data table 30, the account data table 40 and the task data table 50 stored in the storage 15 of the server 10 will be described. FIG. 4 shows the structure of the stamp data table 30. FIG. 5A shows the structure of the account data table 40. FIG. 5B shows the structure of the task data table 50.

The stamp data table 30 is a data table which defines stamps as stamp marks to be shown on a calendar. As shown in FIG. 4A, the stamp data table 30 includes columns (fields) of stamp number 31, sign 32, stamp image 33, task content 34, message 35 and display color 36.

The stamp numbers 31 indicate the identification information of the stamps set according to task types. The signs 32 indicate the letter information of the stamps indicated by the stamp numbers 31. The stamp images 33 indicate the display image data of the stamps indicated by the stamp numbers 31. With respect to the stamp images 33, the letters shown as the signs 32 are encircled. However, this form is not limitative in any way. For example, the stamp images 33 may be in the form of combinations of squares and the letters. The task contents 34 indicate the preset content information of the tasks corresponding to the stamps indicated by the stamp numbers 31. The messages 35 indicate the preset messages of the tasks corresponding to the stamps indicated by the stamp numbers 31. With respect to "Mr. XX", "XX" is the name of the person who entered the task.

The display colors 36 indicate the preset basic display color information of the stamps indicated by the stamp numbers 31. Each pieces of information in the stamp data table 30 is preset by the CPU 11 of the server 10 in accordance with operation inputs carried out by a user such as a manager on the operating unit 22 of a terminal device 20, for example.

The account data table 40 is a table including account information of the staffs at the restaurant (users of the terminal devices 20). As shown in FIG. 5A, the account data table 40 includes columns such as staff number 41, name 42, position 43, task in charge 44, password 45 and importance 46.

The staff numbers 41 indicate the identification information of the staffs at the restaurant and in the embodiment, the identification information also functions as login IDs. The names 42 indicate the name information of the staffs indicated by the staff numbers 41. The positions 43 indicate the position information of the staffs indicated by the staff numbers 41. The task in charge 44 indicates the information relating to the tasks and task areas which each of the staffs indicated by the staff numbers 41 is in charge of. The passwords 45 indicate the password information of the staffs indicated by the staff numbers 41. The importance 46 indicates the preset importance information of each of the tasks corresponding to the stamps which are entered by the staffs indicated by the staff numbers 41. The importance 46 information is associated to the position 43 information.

The task data table 50 is a table including information relating to the entered tasks. The task data table 50 includes columns such as task number 51, personal/business 52, person who made the entry 53, importance 54, entered date and time 55, deadline 56, completed/not completed 57, person who carried out the task 58, task completed date 59, message 60, task association 61, attached file 62, whether to inform all staffs other than the person who made the entry 63 and stamp number 64.

The task numbers 51 indicate the identification information of the entered tasks. The personal/business 52 indicates whether each of the tasks indicated by the task numbers 51 is a personal to-do task which is entered personally or a business to-do task entered through the business supporting services such as the accounting service, the salary payment service, etc. provided by an external business supporting server (not shown) or the like. In the embodiment, with respect to the personal/business 52, it is assumed that all of the tasks are indicated as being personal to-do tasks.

The person who made the entry 53 indicates the name of the person, who is a staff, who entered each of the tasks indicated by the task numbers 51. The importance 54 indicates the importance (priority) information in terms of carrying out each of the tasks indicated by the task numbers 51 and is based on the importance 46 of the person who made the entry indicated in the account data table 40. The entered date and time 55 indicates the entered date and time information of each of the tasks indicated by the task numbers 51. The deadlines 56 indicate the deadline information by when the tasks indicated by the task numbers 51 need to be completed. The completed/not completed 57 indicates the condition information of each of the tasks indicated by the task numbers 51 whether it is completed or not completed. The person who carried out the task 58 indicates the name of the person, who is a staff, who carried out each of the tasks indicated by the task numbers 51. The task completed dates 59 indicate the date information when the tasks indicated by the task numbers 51 were completed.

The messages 60 indicate the message information which are displayed in association with the tasks indicated by the task numbers 51 and describes the task contents. The task association 61 indicates the name of the business supporting service application program associated to each of the tasks indicated by the task numbers 51. In the embodiment, with respect to the task association 61, it is assumed that all of the tasks are indicated as not having an application program associated thereto.

The attached files 62 indicate the names of the attached text or audio files which are input in association with the tasks indicated by the task numbers 51. With respect to each of the tasks indicated by the task numbers 51, whether to inform all staffs other than the person who made the entry 63 indicates whether to display the task information so as to inform all staffs other than the person who made the entry of the task information. If "yes" is indicated for weather to inform all staffs other than the person who made the entry 63, such tasks will be displayed in the terminal devices of all the staffs at the restaurant including the person who made the entry. If "no" is indicated for weather to inform all staffs other than the person who made the entry 63, such tasks will only be displayed in the terminal device of the person who made the entry among the staffs at the restaurant. The stamp numbers 64 indicate the identification information of the stamps which are associated with the tasks indicated by the task numbers 51.

Figure 7:
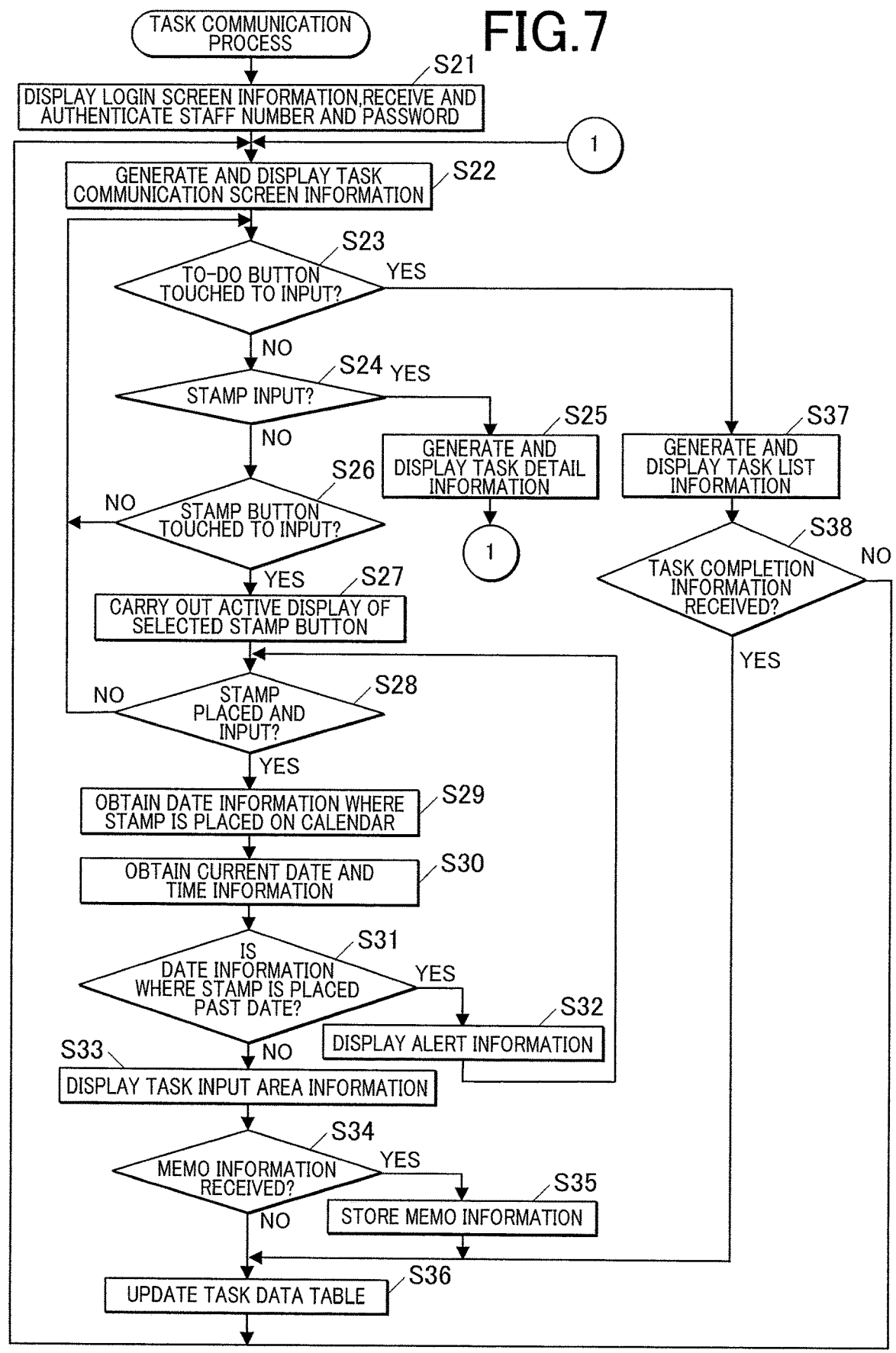
FIG. 7 is a flowchart of a task communication process.

Next, with reference to FIGS. 6 to 9B, the operation of the task management system 1 will be described. FIG. 6 is the flowchart of the information display input process. FIG. 7 is the flowchart of the task communication process. FIG. 8A shows the task communication screen 300A. FIG. 8B shows the task communication screen 300B. FIG. 8C shows the task communication screen 300C. FIG. 9A shows the task communication screen 300D. FIG. 9B shows the task communication screen 300E.

First, with reference to FIG. 6, the information display input process which is carried out in a terminal device 20 will be described. The information display input process is a process to carry out display of the display information relating to the task communication process and to carry out input and receiving of information. In the terminal device 20, input of an instruction to carry out the information display input process by a user via the operating unit 22 being the trigger, the CPU 21 carries out the information display input process in cooperation with the information display input program 251 which is read out from the storage 25 and deployed in the RAM 23.

First, the CPU 21 determines whether an instruction to end the information display input process is input via the operating unit 22 (step S11). If the CPU 21 determines that the instruction to end the process is input (step S11; YES), the CPU 21 ends the information display input process. If the CPU 21 determines that the instruction to end the process is not input (step S11; NO), the CPU 21 determines whether display information is received from the server 10 via the wireless communicator 26 (step S12).

If the CPU 21 determines that the display information is received (step S12; YES), the CPU 21 displays the display information which is received in step S12 (step S13). Then, the CPU 21 determines whether information is input through operation inputs other than the instruction to end the process via the operating unit 22 or through an audio input via the audio input and output unit 27 (step S14). If the CPU 21 determines that the display information is not received (step S12; NO), the CPU 21 proceeds to step S14.

If the CPU 21 determines that the information is input (step S14; YES), the CPU 21 sends the input information (operating information, text information, audio information, etc.) which is input in step S14 to the server 10 via the wireless communicator 26 (step S15) and proceeds to step S11. If the CPU 21 determines that the information is not input (step S14; NO), the CPU 21 proceeds to step S11.

Next, with reference to FIGS. 7 to 9B, the task communication process which is carried out in the server 10 will be described. The task communication process is a process where a staff at the restaurant enters a task of himself/herself or another staff by using a stamp and shows the entered stamp relating to the task on the calendar information in order to communicate with the other staffs about the entered task. The calendar information is a schedule template including a plurality of schedule areas that are respectively associated with predetermined date information or time zone information. In the embodiment, the calendar information is a view display where the schedule areas are shown by dates and the dates are arranged according to time sequence.

In the terminal device 20 of a staff, an instruction to execute the task communication process is input in accordance with step S14 of the information display input process in FIG. 6 and the instruction to execute the task communication process is sent to the server 10 in step S15. Then, in the server 10, receiving of the instruction to execute the task communication process from the terminal device 20 via the communicator 16 in accordance with step S15 of the information display input process in FIG. 6 being the trigger, the CPU 11 carries out the task communication process in cooperation with the task communication program 151 which is read out from the storage 15 and deployed in the RAM 13.

First, the CPU 11 generates login screen information, sends the generated login screen information to the terminal device 20 which is in communication via the communicator 16 and makes the terminal device 20 display the login screen information in accordance with steps S12 and S15 of the information display input process in FIG. 6. The CPU 11 further receives the staff number as the login ID and the password from the terminal device 20 which is in communication, reads out the account data table 40 from the storage 15 and carries out login authentication by using the received staff number and password and the account data table 40 (step S21). The login screen information includes areas for inputting the login ID and the password.

In accordance with step S21, the CPU 21 of the terminal device 20 receives and displays the login screen information in steps S12 and S13 in FIG. 6, inputs the staff number as the login ID and the password via the operating unit 22 in steps S14 and S15 in FIG. 6 and sends the input information to the server 10. The CPU 11 carries out the login authentication on the basis of whether the received staff number and password are in the records of staff number 41 and password 45 in the account data table 40.

Thereafter, the CPU 11 obtains the current date and time information from the counter 17, reads out the stamp data table 30 and the task data table 50 from the storage 15, generates the task communication screen information corresponding to the user who is authenticated in step S21 by using the current date and time information, the stamp data table 30, the account data table 40 and the task data table 50, sends the generated task communication screen information to the terminal device 20 which is in communication via the communicator 16 in accordance with step S12 in FIG. 6 and makes the terminal device 20 display the generated task communication screen information (step S22).

In step S22, the CPU 11 prepares the calendar information of the current month corresponding to the current time information and then, with respect to the task records in the task data table 50 whose deadlines 56 are in the current month, "yes" or "no" is indicated for whether to inform all staffs other than the person who made the entry 63 and the logged in user is the person who made the entry 53, the CPU 11 places the stamp images 33 of the stamps corresponding to the stamp numbers 64 on the dates of the deadlines 56 in the calendar information. The CPU 11 generates the task communication screen information including the display region of the calendar information in which the stamps are placed, the display region of the name 42 of the staff who is logged in, the stamp button selecting region for entering a stamp and the after-mentioned to-do button. Although the stamps in the calendar information are shown in the display color 36, it is preferred that different display colors are set according to completed/not completed 57 and whether the person who made the entry 53 is the logged in user. Further, with respect to the plurality of stamps which are placed on the same date in the calendar information, they are to be listed in descending order according to their importance level. Furthermore, in the task communication screen information, if a stamp button is touched to input in the stamp button input region, the stamp number corresponding to the input stamp button can be specified.

In accordance with step S22, the CPU 21 of the terminal device 20 receives and displays the task communication screen information in step S12 and S13 in FIG. 6. In step S22, the task communication screen information showing the task communication screen 300A shown in FIG. 8A is generated, for example. The task communication screen 300A is the screen corresponding to the case where only the tasks whose task numbers 51 are 1 and 2 in the task data table 50 shown in FIG. 5B are entered.

The task communication screen 300A includes the logged in user display region 310, the to-do button 320, the calendar display region 330 and the stamp button selecting region 340. The logged in user display region 310 is the region for showing the logged in user. The task communication screen 300A is an example where the logged in user shown in the logged in user display region 310 is Jiro Yamada who is the manager. The to-do button 320 is the button for receiving the input for showing the list of the tasks whose deadlines are the day of login.

The calendar display region 330 is the display region for the calendar information in which the stamps of the tasks are shown on the dates of their deadlines in the calendar of the logged in month. The calendar display region 330 includes the stamp 331 indicating the task which is a meeting and the stamp 332 indicating the task which is an order placement, for example. The stamps in the calendar display region 330 can be input by a user carrying out a touch input.

The stamp button selecting region 340 is a display region including stamp buttons for making selection when entering a stamp. The stamp button selecting region 340 includes stamp buttons 341, 342 and 343 respectively indicating the tasks which are order placement, schedule and event and the display button 344 for displaying other stamp buttons. Based on the using history information of the stamp buttons (not shown), the stamp buttons 341, 342 and 343 are arranged from the left to right according to their last used dates, from the date closest to the current date to the date furthest from the current date. The display button 344 is a button for receiving a touch input for displaying stamp buttons other than the stamp buttons 341, 342 and 343 and the list information of other stamp buttons can be displayed by carrying out a touch input on the display button 344, for example.

In accordance with step S22, the CPU 21 of the terminal device 20 receives an input carried out on the to-do button 320, a stamp in the calendar display region 330 or a stamp button in the stamp button selecting region 340 via the operating unit 22 and sends the input information to the server 10 in steps S14 and S15 in FIG. 6.

Then, in accordance with step S15 in FIG. 6, the CPU 11 determines whether the to-do button 320 is touched to input according to whether the touch input information of the to-do button 320 is received from the terminal device 20 which is in communication via the communicator 16 (step S23). If the CPU 11 determines that the to-do button 320 is not touched to input (step S23; NO), the CPU 11, in accordance with step S15 in FIG. 6, determines whether a stamp in the calendar display region 330 is touched to input according to whether the touch input information of a stamp in the calendar display region 330 is received from the terminal device 20 which is in communication via the communicator 16 (step S24).

If the CPU 11 determines that a stamp is touched to input (step S24; YES), the CPU 11 generates task detail information corresponding to the task relating to the stamp which is touched to input on the basis of the task data table 50 stored in the storage 15 and the memo information, sends the task detail information to the terminal device 20 which is in communication, makes the terminal device 20 display the task detail information (step S25) and proceeds to step S22. The task detail information includes the message 60, the memo information, whether the task is completed/not completed 57 and the entered date and time 55 relating to the task corresponding to the stamp which is touched to input, for example. In accordance with step S25, the CPU 21 of the terminal device 20 receives and displays the task detail information in steps S12 and S13 in FIG. 6.

If the CPU 11 determines that a stamp is not touched to input (step S24; NO), the CPU 11, in accordance with step S15 of the information display input process in FIG. 6, determines whether a stamp button is touched to input according to whether the touch input information of a stamp button in the stamp button selecting region 342 is received from the terminal device 20 which is in communication via the communicator 16 (step S26). The touch input information of a stamp button includes the stamp number corresponding to the stamp button which is touched to input.

If the CPU 11 determines that a stamp button is not touched to input (step S26; NO), the CPU 11 proceeds to step S23. If the CPU 11 determines that a stamp button is touched to input (step S26; YES), the CPU 11, in accordance with step S12 of the information display input process in FIG. 6, sends the active display information of the stamp button which is selected in step S26 to the terminal device 20 which is in communication and makes the terminal device 20 carry out active display of the selected stamp button (step S27).

In accordance with step S27, the CPU 21 of the terminal device 20 receives and displays the active display information of the selected stamp button in steps S12 and S13 in FIG. 6. For example, the stamp button 341 is actively displayed as shown in the task communication screen 300B in FIG. 8B. In accordance with step S27, the CPU 21 of the terminal device 20 further inputs the position information of the destination for the stamp placement (placement destination position information) relating to the date where the actively displayed stamp is to be placed in the calendar display region 330 via the operating unit 22 and sends the input information to the server 10 in steps S14 and S15 in FIG. 6.

Then, the CPU 11 determines whether the stamp placement is input according to whether the placement destination position information is received from the terminal device 20 which is in communication via the communicator 16 (step S28). If the CPU 11 determines that the stamp placement is not input (step S28; NO), the CPU 11 proceeds to step S23.

If the CPU 11 determines that the stamp placement is input (step S28; YES), the CPU 11 obtains the date information of the destination for the stamp placement (placement destination date information) in the calendar on the basis of the placement destination position information received in step S28 (step S29). Then, the CPU 11 obtains the current date and time information from the counter 17 (step S30). Thereafter, the CPU 11 determines whether the placement destination date information obtained in step S29 is before (in the past) the date information of the current date and time information obtained in step S30 (step S31).

If the CPU 11 determines that the placement destination date information is in the past comparing to the date information of the current date and time information (step S31; YES), the CPU 11 generates the alert information indicating that the stamp is placed on the past date and the task cannot be carried out, and in accordance with step S12 in FIG. 6, the CPU 11 sends the generated alert information to the terminal device 20 which is in communication via the communicator 16, makes the terminal device 20 display the alert information (step S32) and proceeds to step S28. In accordance with step S32, the CPU 21 of the terminal device 20 receives and displays the alert information in steps S12 and S13 in FIG. 6.

If the CPU 11 determines that the placement destination date information is not in the past comparing to the date information of the current date and time information (step S31; NO), the CPU 11 generates the task input region information for receiving information input relating to the task corresponding to the placed stamp on the basis of the task number in the touch input information of the stamp button which is input in step S26, sends the task input region information to the terminal device 20 via the communicator 16 and makes the display device 20 display the task input region information in accordance with step S12 in FIG. 6 (step S33).

In accordance with step S33, the CPU 21 of the terminal device 20 receives and displays the task input region information in steps S12 and S13 in FIG. 6. In step S33, the task input region information of the task input region 350 included in the task communication screen 300B of FIG. 8B is generated, for example. The task input region 350 includes the memo attachment selecting region 351, the text input region 352, the audio input region 353, the task display selecting region 354, the send button 355 and the cancel button 356.

The memo attachment selecting region 351 is an input region for receiving a selecting input whether to attach memo information in association with the placed stamp. For example, the memo attachment selecting region 351 includes radio buttons. The text memo input region 352 is an input region for receiving a text input of the memo information which is attached by the operation carried out in the memo attachment selecting region 351. The audio input region 353 is an input region for receiving an audio input of the memo information which is attached by the operation carried out in the memo attachment selecting region 351. For example, the audio input is received by a touch input. The task display selecting region 354 is an input region for receiving a selecting input whether to display the task corresponding to the placed stamp in the task communication screens of other staffs. For example, the task display selecting region 354 includes radio buttons. The send button 355 is a button for receiving the sending execution of the input information in the task input region 350 to the server 10. The cancel button 356 is a button for receiving the cancelation of the input information in the task input region 350.

Thereafter, in accordance with step S33, the CPU 21 of the terminal device 20 inputs the input information of the task input region 350 via the operating unit 22 and the audio input and output unit 27 and sends the input information to the server 10 in steps S14 and S15 in FIG. 6. The text memo information and the audio memo information are sent in the forms of a text file and an audio file, for example.

Then, in accordance with step S15 in FIG. 6, the CPU 11 receives the input information such as the memo information from the terminal device 20 which is in communication via the communicator 16 and determines whether the memo information is received (step S34). The input information includes the information indicating whether memo information is attached to the task, text memo information, audio memo information and information on whether other staffs are to be informed of the task. If the CPU 11 determines that the memo information is received (step S34; YES), the CPU 11 stores the text memo information and the audio memo information which are received in step S34 as the attached files associated with the task number of the task corresponding to the stamp button which is input in step S26 in the storage 15 (step S35).

If the CPU 11 determines that the memo information is not received (step S34; NO) or after step S35, the CPU 11 updates the task data table 50 stored in the storage 15 with the stamp data table 30 and the account data table 40 stored in the storage unit 15 and various types of information relating to the task input in steps S26, S29, S30, S34 and S38 (step S36) and proceeds to step S22.

Here, an updating example of the task data table 50 in a case where a stamp and a task corresponding to the stamp are entered in step S36 will be described. For example, it is assumed that the logged in user is Jiro Yamada who is the manager, the order placement stamp button is selected in step S26, the placement destination date information indicates Feb. 8, 2016 in step S29, the current date and time information obtained in step S30 indicates 18:35 on Feb. 8, 2016, the text memo information and the information indicating that other staffs are to be informed are input in step S34 and the stamp is entered.

In step S36, the record whose task number 51 in FIG. 5B is 3 is added and updated. In particular, in the order of the task number 51, the personal/business 52, the person who made the entry 53, the importance 54, the entered date and time 55, the deadline 56, whether the task is completed/not completed 57, the person who carried out the task 58, the task completed date 59, the message 60, the task association 61, the attached file 62, whether to inform all staffs other than the person who made the entry 63 and the stamp number 64, the record is added to the task data table 50, the record including "3", personal to-do task, Jiro Yamada who is the logged in user, "2" for importance 46 corresponding to manager, 18:35, Feb. 8, 2016 obtained in step S28, Feb. 8, 2016 obtained in step S29, not completed as just been entered, "no" for the person who carried out the task, "no" for the task completed date, the message 35 "From Jiro Yamada (=XX) . . . " corresponding to the order placement stamp, "no" for the task association, the file name of the text memo information obtained in step S35, "yes" for whether to inform all staffs other than the person who made the entry obtained in step S34 and "1" for the stamp number 31 corresponding to order placement obtained in step S26.

For example, in step S22 after the order placement task is entered, the task communication screen information which is the task communication screen 300C shown in FIG. 8C is generated. In the task communication screen 300C, the order placement stamp 333 which is currently entered and the order placement stamp 332 which was entered before the stamp 333 and whose importance level is lower than the stamp 333 are shown in the date section corresponding to Feb. 8, 2016 in the calendar display region 330 in this order.

In step S22, the CPU 11 refers to the task data table 50 and if there exists a record whose deadline 56 is today corresponding to the current date and time information and the completed/not completed 57 information indicates that the task is not completed, the CPU 11 generates task communication screen information in a manner where the to-do button is vibrating or the like, send the task communication screen information to the terminal device 20 and makes the terminal device 20 display the task communication screen information. In such way, the user of the terminal device 20 can visually notice the to-do button vibrating and can realize that there exists a task whose deadline is today and which is not yet completed.

Here, for example, it is assumed that Saburo Suzuki who is a part time staff used his terminal device 20 and logged in in accordance with step S21 after the task relating to the order placement stamp 333 is entered. In Saburo Suzuki's terminal device 20, the task communication screen which is the same as the task communication screen 300C in which the name Saburo Suzuki is shown in the logged in user display region 310 is displayed in accordance with step S22.

If the to-do button 320 is touched to input (step S23; YES), the CPU 11 reads out the task data table 50 from the storage 15, obtains the current date and time information from the counter 17, generates the task list information including the list information of not completed tasks on the basis of the task data table 50 and the current date and time information, sends the generated task list information to the terminal device 20 which is in communication and makes the terminal device 20 display the task list information in accordance with step S12 in FIG. 6 (step S37).

In accordance with step S37, the CPU 21 of the terminal device 20 receives and displays the task list information in steps S12 and S13 in FIG. 6. In step S37, the task list information shown in the task list display region 360 included in the task communication screen 300D in FIG. 9A is displayed, for example. The task list display region 360 includes task information display regions 360*a* and 360*b* showing, in task units, the tasks whose deadlines are today, "yes" or "no" is indicated for whether to inform staffs other than the person who made the entry, which were entered by the logged in user and which are not completed yet. The task information display regions 360*a* and 360*b* respectively correspond to the tasks relating to the order placement stamps 333 and 332. Each of the task information display regions 360*a* and 360*b* includes the stamp display region 361, the message display region 362, the memo information display region 363 and the completed button 364. The task information display regions 360*a* and 360*b* are shown in the order of importance level, starting from the higher importance task at the top.

The stamp display region 361 is a region for showing the stamp image 33 corresponding to the stamp number 64 of the task record where the date of the current date and time information is the deadline 56, "yes" or "no" is indicated for whether to inform all staffs other than the person who made the entry 63, the person who made the entry 53 is the logged in user and "not completed" is indicated for the completed/not completed 57 information in the task data table 50. The message display region 362 is a region for showing the message 60 of the task corresponding to the stamp shown in the stamp display region 361. The memo information display region 363 is a region for showing the attached file 62 of the task corresponding to the stamp shown in the stamp display region 361.

A text message is shown in the memo information display region 363 if the memo information of the attached file 62 attached to the task record corresponding to the stamp shown in the stamp display region 361 is a text file. An audio output button is shown if the memo information is in the form of audio. By touching the audio output button to input, the audio file of the attached file 62 is output from the audio input and output unit 27 in the form of audio. The completed button 364 is a button for receiving a touch input indicating that the task is completed via the operating unit 22 with respect to the task corresponding to the stamp shown in the stamp display region 361 after the task is completed by the logged in user.

Then, in accordance with step S37, the CPU 21 of the terminal device 20 receives the touch input carried out on the completed button 364 in the task list display region 360 via the operating unit 22 and sends the task completion information corresponding to the input to the server 10 in steps S14 and S15 in FIG. 6. Here, for example, it is assumed that the touch input is carried out on the completed button 364 in the task information display region 360*a* by Saburo Suzuki who completed the task and the task completion information is sent to the server 10.

In accordance with step S15 in FIG. 6, the CPU 11 determines whether the task completion information is received from the terminal device 20 which is in communication via the communicator 16 (step S38). If the CPU 11 determines that the task completion information is not received (step S38; NO), the CPU 11 proceeds to step S22.

If the CPU 11 determines that the task completion information is received (step S38; YES), the CPU 11 proceeds to step S36.

Here, an updating example of the task data table 50 in a case where a task is completed in step S36 will be described. For example, it is assumed that the logged in user is Saburo Suzuki who is a part time staff, a touch input is carried out on the completed button 364 corresponding to the task shown in the task information display region 360*a* and the task completion information includes the task number of the order placement task corresponding to the stamp 333 and the information indicating that the task is completed. In step S36, the completed/not completed 57 information of the record whose task number 51 is 3 in FIG. 5B is updated to completed, the person who carried out the task 58 is updated to the name 42 of the logged in user (Saburo Suzuki) and the task completed date 59 is updated to the date information of the current date and time information.

Then, for example, it is assumed that Jiro Yamada who is the manager used his terminal device 20 and logged in again in accordance with step S21 after completion of the order placement task corresponding to the stamp 333 is input. In the terminal device 20 of Jiro Yamada, the task communication screen 300E shown in FIG. 9B is displayed in accordance with step S22. In the task communication screen 300E, the stamp 333 is shown in the color indicating that this task is completed which is the same color as the color of the stamp 331 in the calendar display region 330 (for example, in a color lighter than the basic display color).

As described above, according to the embodiment, the server 10 sends the task communication screen information including the calendar display region in which a plurality of dates are set to the terminal device 20 and makes the terminal device 20 display the task communication screen information, selects a predetermined stamp from a plurality of stamps (stamp buttons) in accordance with a user's operation, selects the date where the selected stamp is to be placed from a plurality of dates in accordance with a user's operation, sends the calendar display region in which the selected stamp is placed on the selected date to the terminal device 20 and makes the terminal device 20 display the calendar display region.

Therefore, the content of the task which needs to be carried out and the deadline for carrying out the task can be input easily and can be recognized easily and further, the users can be supported so as to assure that the task will be carried out by the deadline. More in particular, the content of the task can be input quickly in short period of time by using the stamp to input, reducing the necessity of inputting letters. Thus, the task information can be input easily through a portable terminal device 20 such as a smartphone or the like. In such way, time restriction can be reduced as a result of quick input and place restriction can be reduced as a result of carrying out the input on a portable terminal device 20. Further, since the stamps relating to the tasks can be shown on dates in the calendar and the task information can be shown clearly and together according to dates by using the stamps in the terminal device 20.

The server 10 further stores the task data table 50 in which the stamp numbers of the selected stamps and the selected dates are made to be associated with the task numbers in the storage 15. Therefore, the contents of the tasks and the deadlines can be entered easily by using the stamps.

The server 10 further receives the memo information as the attached information indicating the content of the task corresponding to the selected stamp from the terminal device 20, stores the received memo information in the storage 15 so as to be associated with the task number of the task corresponding to the selected stamp, sends the memo information associated with the stamp to the terminal device 20 and makes the terminal device 20 display the memo information on the basis of the stored task data table 50. Therefore, by using the memo information, the content information of the task which cannot be expressed only by the stamp can be stored and can be displayed clearly.

The server 10 further makes the terminal device 20 display the task communication screen information including the calendar display region in which a plurality of dates are set, and places and shows a stamp on one of the dates. In a case where a stamp is placed and shown on the current date among the plurality of dates in the calendar display region which is being displayed, the server 10 sends the message information corresponding to the stamp to the terminal device 20 in accordance with a user's operation (touch input of the to-do button) and makes the terminal device 20 display the message information. Therefore, the content of the task which needs to be carried out and the deadline for carrying out the task can be input easily and can be recognized easily. Further, the users can be supported so as to assure that the task will be carried out by the deadline.

The server 10 further reads out the message information corresponding to the stamp shown on the date corresponding to the current date and time from the stamp data table 30 in the storage 15, sends the read out message information to the terminal device 20 and makes the terminal device 20 display the message information. Therefore, the message information corresponding to the stamp shown on the date corresponding to the current date and time can be displayed easily.

The server 10 further receives the task completion information in which the completed task among the not yet completed tasks corresponding to the stamps shown in the terminal device 20 is input from the terminal device 20 and sets the completed/not completed 57 information of the completed task to "completed" on the basis of the received task completion information. Therefore, the task which is carried out and completed can be easily set to "completed".

In the above description, an example where a HDD or a SSD in the storage 15 is used as the non-transitory computer readable recording medium of the program according to the present invention is disclosed. However, this example is not limitative in any way. As for other computer readable recording medium, portable recording medium such as a flash memory, a CD-ROM or the like can be used. Further, as a medium for providing the data of the program according to the present invention via the communication line, a carrier wave can be used in the present invention.

The above description of the embodiment is an example of the task management device, the task management method and the computer readable recording medium according to the present invention and the embodiment is not limitative in any way.

For example, in the above embodiment, the task completion information of the task whose deadline is today and which is not yet completed shown in the task list information is to be input after the to-do button is touched to input. However, this is not limitative in any way. The task list information may include the information of the tasks whose deadlines are today or after today so that the task completion information of the tasks whose deadlines are today or after today can be input. Further, the completed button may be included in the detail information of the task which is displayed when a stamp is touched to input so that the task completion information of the task can be input by the completed button being touched to input.

In the above embodiment, a user inputs the memo information from scratch. However, this is not limitative in any way. For example, the CPU 11 of the server 10 can store the memo information which a user inputs through the terminal device 20 in the storage 15 as history information, read out the history information of the memo information from the storage 15 when a user inputs memo information, sends the information to the terminal device 20 which is in communication and makes the terminal device 20 display the information. The user can select from the history information displayed in the display 24 of the terminal device 20 to input new memo information. In such way, the burden of inputting memo information of the task whose content is the same or similar to a previous task can be reduced. If memo information of the task corresponding to a specific stamp number is to be input, the history information of the memo information corresponding to the same stamp number may be displayed to be selected and input.

In the above embodiment, an example where the task management system 1 is applied to a catering business (restaurant) is described. However, this is not limitative in any way. The task management system 1 can be applied to other types of businesses. Since the inputs are carried out by using stamps in the task management system 1, time restriction can be reduced as a result of quick input using the stamps and place restriction can be reduced as a result of carrying out the inputs on a portable terminal device. Therefore, by preparing stamps matching the needs of other types of businesses, the task management system 1 can be widely used in various types of businesses.

In the above embodiment, a stamp button is selected in the task button selecting region 340 in the task communication screen information so as to show the stamp button. However, this is not limitative in any way. If the stamp button of the desired stamp is not shown in the task button selecting region 340, a new stamp may be input and generated so as to be newly registered in the stamp data table 30. In the task communication process, the CPU 21 of the terminal device 20 receives input of stamp setting information such as a stamp image where a desired new letter is encircled, a task content, a message, a display color by a user via the operating unit 22 and sends the stamp setting information to the server 10 via the wireless communicator 26. On the basis of the stamp setting information received from the terminal device 20, the CPU 11 of the server 10 adds the record of the new stamp in the stamp data table 30 and proceeds to step S22.

In the above embodiment, the person who makes the entry does not specify the person who carries out the task. However, this is not limitative in any way. The person who makes the entry may be able to specify the person who carries out the task.

In the above embodiment, the deadline of a task is set to the date by when the task needs to be carried out. However, this is not limitative in any way. The deadline of a task may be set to the date during which the task needs to be carried out. Further, the display of the stamps relating to the tasks may be in different manners according to the above two types of deadlines (for example, the display color may be different).

In the above embodiment, the calendar display region 330 in the task communication screen 300A shown in FIG. 8A or the like is the region for displaying the calendar information as the schedule template including dates as schedule areas. However, this is not limitative in any way. The task communication screen 300F as shown in FIG. 10 may be displayed in the terminal device 20. FIG. 10 shows the task communication screen 300F.

The task communication screen 300F includes the calendar display region 330F. The calendar display region 330F is the region for displaying the calendar information as the schedule template including time zones for each date as schedule areas. In such way, with respect to the calendar information as the schedule template, schedule areas may be set in other ways such as according to am and pm of each date, by weeks, by months, etc.

With respect to the detail structure and the detail operation of individual components of the task management system 1 of the embodiment, they can be modified as needed within the scope of the invention.

Although an embodiment of the present invention is described above, the scope of the invention is not limited by the above described embodiment. The scope of the invention is defined by the claims and the equivalents thereof.

The entire disclosure of Japanese Patent Application No. 2016-058527 filed on Mar. 23, 2016 is incorporated herein by reference in its entirety.

What is claimed is:

1. A task management device which performs user authentication of a user using a login ID, the device comprising:
   a first display controller which controls a display to (i) display, in a first display region, a schedule template including a plurality of schedule areas, predetermined date information or time zone information being associated with each schedule area, and (ii) display, in a second display region adjacent to the first display region, a plurality of stamp marks which indicate different types of tasks and with which different message information for another user is associated;
   a first selecting unit which selects a stamp mark in accordance with an operation by the user, from among the plurality of stamp marks which are displayed in the second display region under the control by the first display controller; and
   a second selecting unit which selects a schedule area in which the stamp mark selected by the first selecting unit is placed in accordance with an operation by the user, from among the plurality of schedule areas,
   wherein the first display controller controls the display to display the schedule template into which the stamp mark selected by the first selecting unit has been placed in the schedule area selected by the second selecting unit, and
   wherein the message information is associated in advance with reply information for replying to the message information when the message information is referenced by the another user.

2. The task management device of claim 1, further comprising an enter unit which controls a storage to store task enter information in which identification information of the stamp mark selected by the first selecting unit and the schedule area selected by the second selecting unit are associated with identification information of a task.

3. The task management device of claim 2, further comprising:
   a first input unit which receives an input of attached information which indicates a content of the task corresponding to the stamp mark selected by the first selecting unit,
   wherein the enter unit controls the storage to store the attached information input by the first input unit in association with the identification information of the task corresponding to the stamp mark selected by the first selecting unit; and
   wherein the first display controller controls the display to display the attached information associated with the stamp mark based on the stored task enter information.

4. The task management device of claim 3, further comprising:
   a second input unit which receives an input of task completion information which indicates a task which is carried out and completed from among not-completed tasks corresponding to stamp marks which are displayed; and
   a completion setting unit which sets a status of the task which is completed to completed based on the task completion information input by the second input unit.

5. The task management device of claim 1, further comprising:
   a second display controller which, in a case in which the stamp mark is placed and displayed in a schedule area from among the plurality of schedule areas in the schedule template displayed by the first display controller, controls the display to display message information associated with the stamp mark in accordance with an operation by a user,
   wherein, in a case in which the operation to display the message information is an operation by the another user, the second display controller controls the display to display, together with the message information, a transmit button to transmit the reply information.

6. A task management method which is performed in a task management device which performs user authentication of a user using a login ID, the method comprising:
   first display controlling to control a display to (i) display, in a first display region, a schedule template including a plurality of schedule areas, predetermined date information or time zone information being associated with each schedule area, and (ii) display, in a second display region adjacent to the first display region, a plurality of stamp marks which indicate different types of tasks and with which different message information for another user is associated;
   first selecting to select a stamp mark in accordance with an operation by the user, from among the plurality of stamp marks which are displayed in the second display region under the control in the first display controlling; and
   second selecting to select a schedule area in which the stamp mark selected in the first selecting is placed in accordance with an operation by the user, from among the plurality of schedule areas,
   wherein in the first display controlling, the schedule template into which the stamp mark selected in the first selecting has been placed in the schedule area selected in the second selecting is displayed, and
   wherein the message information is associated in advance with reply information for replying to the message information when the message information is referenced by the another user.

7. The task management device of claim 1, wherein the first display controller controls to display, in the second display region, a predetermined number of stamp marks having a use history close to a current date, based on stored use history information of the stamp marks.

8. The task management device of claim 1, wherein when the stamp mark selected by the first selecting unit is placed in the schedule area selected by the second selecting unit, the first display controller controls the display to display the stamp mark placed in the schedule area selected by the second selecting unit at a reduced display size.

9. The task management device of claim 1, wherein the display is longer in a vertical direction of the display than a width direction of the display, and
wherein the first display controller controls to set the first display region in an upper region of the display and to set the second display region in a lower region of the display, the second display region being longer in the width direction of the display than in the vertical direction of the display.

10. The task management method of claim 6, further comprising entering to control a storage to store task enter information in which identification information of the stamp mark selected in the first selecting and the schedule area selected in the second selecting are associated with identification information of a task.

11. The task management method of claim 10, further comprising:
first inputting to receive an input of attached information which indicates a content of the task corresponding to the stamp mark selected in the first selecting,
wherein in the entering, the attached information input in the first inputting is stored in the storage in association with the identification information of the task corresponding to the stamp mark selected in the first selecting; and
wherein in the first display controlling, the attached information associated with the stamp mark is displayed based on the stored task enter information.

12. The task management method of claim 11, further comprising:
second inputting to receive an input of task completion information which indicates a task which is carried out and completed from among not-completed tasks corresponding to stamp marks which are displayed; and
completion setting to set a status of the task which is completed to completed based on the task completion information input in the second inputting.

13. The task management method of claim 6, further comprising:
second display controlling in which, in a case in which the stamp mark is placed and displayed in a schedule area from among the plurality of schedule areas in the schedule template displayed in the first display controlling, message information associated with the stamp mark is displayed in accordance with an operation by a user,
wherein, in a case in which the operation to display the message information is an operation by the another user, in the second display controlling, a transmit button to transmit the reply information is displayed together with the message information.

14. A non-transitory computer readable recording medium storing a program for making a computer of a task management device which performs user authentication of a user using a login ID execute a procedure, the procedure comprising:
a first display controlling process to control a display to (i) display, in a first display region, a schedule template including a plurality of schedule areas, predetermined date information or time zone information being associated with each schedule area, and (ii) display, in a second display region adjacent to the first display region, a plurality of stamp marks which indicate different types of tasks and with which different message information for another user is associated;
a first selecting process to select a stamp mark in accordance with an operation by the user, from among the plurality of stamp marks which are displayed in the second display region under the control in the first display controlling process; and
a second selecting process to select a schedule area in which the stamp mark selected in the first selecting process is placed in accordance with an operation by the user, from among the plurality of schedule areas,
wherein in the first display controlling process, the schedule template into which the stamp mark selected in the first selecting process has been placed in the schedule area selected in the second selecting process is displayed, and
wherein the message information is associated in advance with reply information for replying to the message information when the message information is referenced by another user.

15. The non-transitory computer readable recording medium of claim 14, the procedure further comprising an enter process to control a storage to store task enter information in which identification information of the stamp mark selected in the first selecting process and the schedule area selected in the second selecting process are associated with identification information of a task.

16. The non-transitory computer readable recording medium of claim 15, the procedure further comprising:
a first input process to receive an input of attached information which indicates a content of the task corresponding to the stamp mark selected in the first selecting process,
wherein in the enter process, the attached information input in the first input process is stored in the storage in association with the identification information of the task corresponding to the stamp mark selected in the first selecting process; and
wherein in the first display controlling process, the attached information associated with the stamp mark is displayed based on the stored task enter information.

17. The non-transitory computer readable recording medium of claim 16, the procedure further comprising:
a second input process to receive an input of task completion information which indicates a task which is carried out and completed from among not-completed tasks corresponding to stamp marks which are displayed; and
a completion setting process to set a status of the task which is completed to completed based on the task completion information input in the second input process.

18. The non-transitory computer readable recording medium of claim 14, the procedure further comprising:
a second display controlling process to, in a case in which the stamp mark is placed and displayed in a schedule area from among the plurality of schedule areas in the schedule template displayed in the first display controlling process, control the display to display message information associated with the stamp mark in accordance with an operation by a user,
wherein, in a case in which the operation to display the message information is an operation by the another user, in the second display controlling process, a transmit button to transmit the reply information is displayed together with the message information.

* * * * *